Aug. 14, 1951 R. F. STEHLIK 2,564,084

TELEPHONE SYSTEM HAVING REPEATER INSERTION
ON LONG DISTANCE LINES

Filed Nov. 1, 1947 5 Sheets-Sheet 1

INVENTOR
RUDOLPH FRANK STEHLIK

BY Chas. Lee. Candy

ATTORNEY

INVENTOR
RUDOLPH FRANK STEHLIK

BY Chas. W. Candy
ATTORNEY

INVENTOR
RUDOLPH FRANK STEHLIK
BY Chas. L. Candy
ATTORNEY

INVENTOR
RUDOLPH FRANK STEHLIK

BY [signature]
ATTORNEY

Aug. 14, 1951 R. F. STEHLIK 2,564,084

TELEPHONE SYSTEM HAVING REPEATER INSERTION ON LONG DISTANCE LINES

Filed Nov. 1, 1947 5 Sheets-Sheet 5

INVENTOR
RUDOLPH FRANK STEHLIK

BY Chas. Wm. Candy
ATTORNEY

Patented Aug. 14, 1951 2,564,084

UNITED STATES PATENT OFFICE 2,564,084

TELEPHONE SYSTEM HAVING REPEATER INSERTION ON LONG DISTANCE LINES

Rudolph Frank Stehlik, Antwerp, Belgium, assignor to Automatic Electric Laboratories Inc., Chicago, Ill., a corporation of Delaware Application November 1, 1947, Serial No. 783,569
In Great Britain November 2, 1946

6 Claims. (Cl. 179—18)

The present invention relates to telephone systems and is more particularly concerned with systems for automatically setting up long distance connections which may require the insertion of a repeater or signal amplifier.

The invention has particular application to systems in which tandem exchanges for long distance connections may also operate as originating or terminating exchanges for long distance connections. In the first case a repeater would probably be inserted into the connection at the tandem exchange while it would be unnecessary in the two latter cases. Under such conditions considerations of economy require that the repeaters should be provided at the tandem exchange in common to a number of junction lines, means such as a distributor being provided for connecting up the repeaters in turn. With an arrangement of this nature it is obviously necessary to provide arrangements which will ensure that the repeaters will be satisfactorily balanced with any of the junction lines to which they are accessible and it is the object of the invention to provide such arrangements.

According to the invention the association of a repeater with a junction line causes a switching device to become operative to select the balancing network appropriate to the junction line and to associate the selected balancing network with the repeater.

According to a feature of the invention the relay set of an incoming junction serves to select an idle repeater and to control the connection of the appropriate balancing network to the incoming end thereof while the balancing network of the outgoing junction line over which the connection is extended is connected to the outgoing end of the repeater by the operation of a switching device operated under the control of markings extended thereto from the outgoing junction relay set.

The invention will be better understood from the following description of one embodiment taken in conjunction with the accompanying drawings comprising Figs. 1–5 in which.

Figure 1:
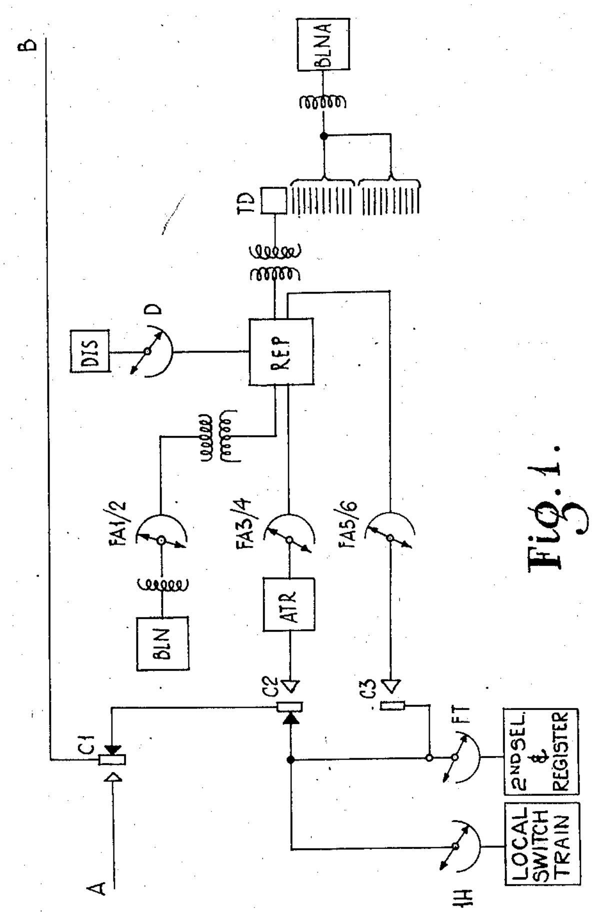
Fig. 1 shows in schematic form the arrangements for connecting up a repeater.

Referring first to Fig. 1, the junction line is indicated by B and on an incoming call to the tandem exchange the connection is extended over changeover contacts C1 and C2 to the hunting switch FT. This switch operates to find an idle register to which are transmitted the digital impulses received over the junction line. If the digits received indicate that the call is for a local subscriber at the tandem exchange, the connection over the hunting switch FT is released and the connection is completed over the preselector 1H which has access to the local switch train. If the digits received indicate that the call is for an exchange accessible over an outgoing junction line which does not require a repeater, no operation of the changeover contacts C2 and C3 will occur and a circuit such as shown in the drawing and associated with the required junction line such as B will be taken into use by the register and the connection will be extended over a junction line such as B.

If however the digits received by the register indicate that the call is for a distant exchange requiring a repeater, a signal is transmitted from the register to the incoming junction relay set to cause the operation of changeover contacts C2 and C3 whereupon the switch FA hunts for the idle repeater REP which has been preselected by the hunting switch D under the control of the distributor DIS. The balancing network BLN is connected to the incoming end of the repeater over wiper FA1/2 while the speaking connection will extend over the attenuator ATR, wiper FA3/4, repeater REP and wiper FA5/6. In the meantime the register has caused the selection of an outgoing junction line to the required exchange, which junction line and the balancing network BLNA appropriate to the junction line must now be associated with the outgoing end of the repeater. This is effected by the two-directional switch TD which has access to the balancing networks associated with all junction lines. Markings are extended to the vertical and rotary banks of the switch TD from the junction relay set, which thereupon hunts to find the balancing network BLNA and associate it with the outgoing end of the repeater.

An attenuator ATR is provided for each junction line since the repeaters are all of the fixed gain type. The attenuator is adjusted according to the attenuation characteristics of the associated junction line so that the repeater will give a constant output level with any junction line.

Figure 2:
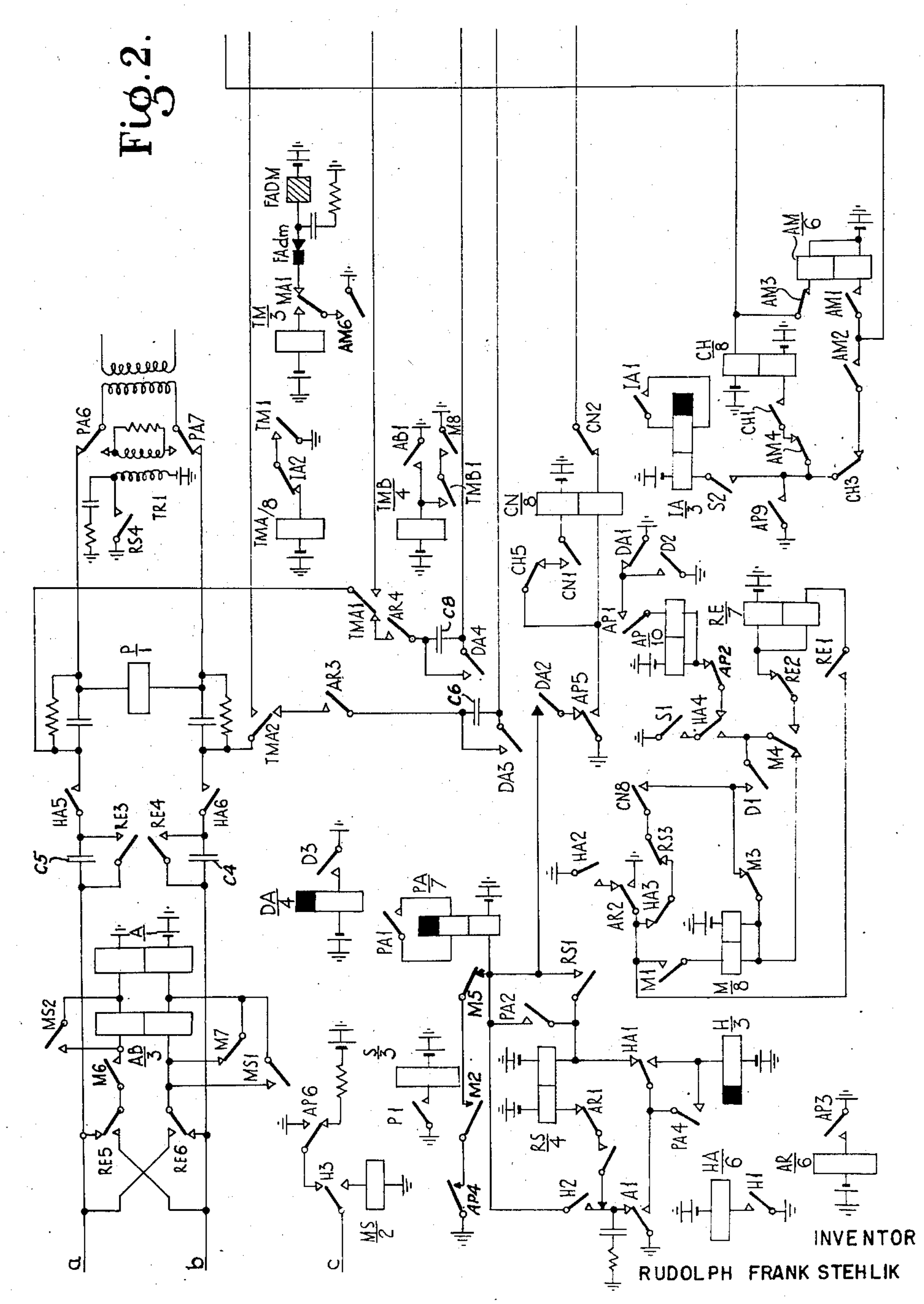
Figs. 2 and 3 show in detail a junction relay set.
Figure 3:
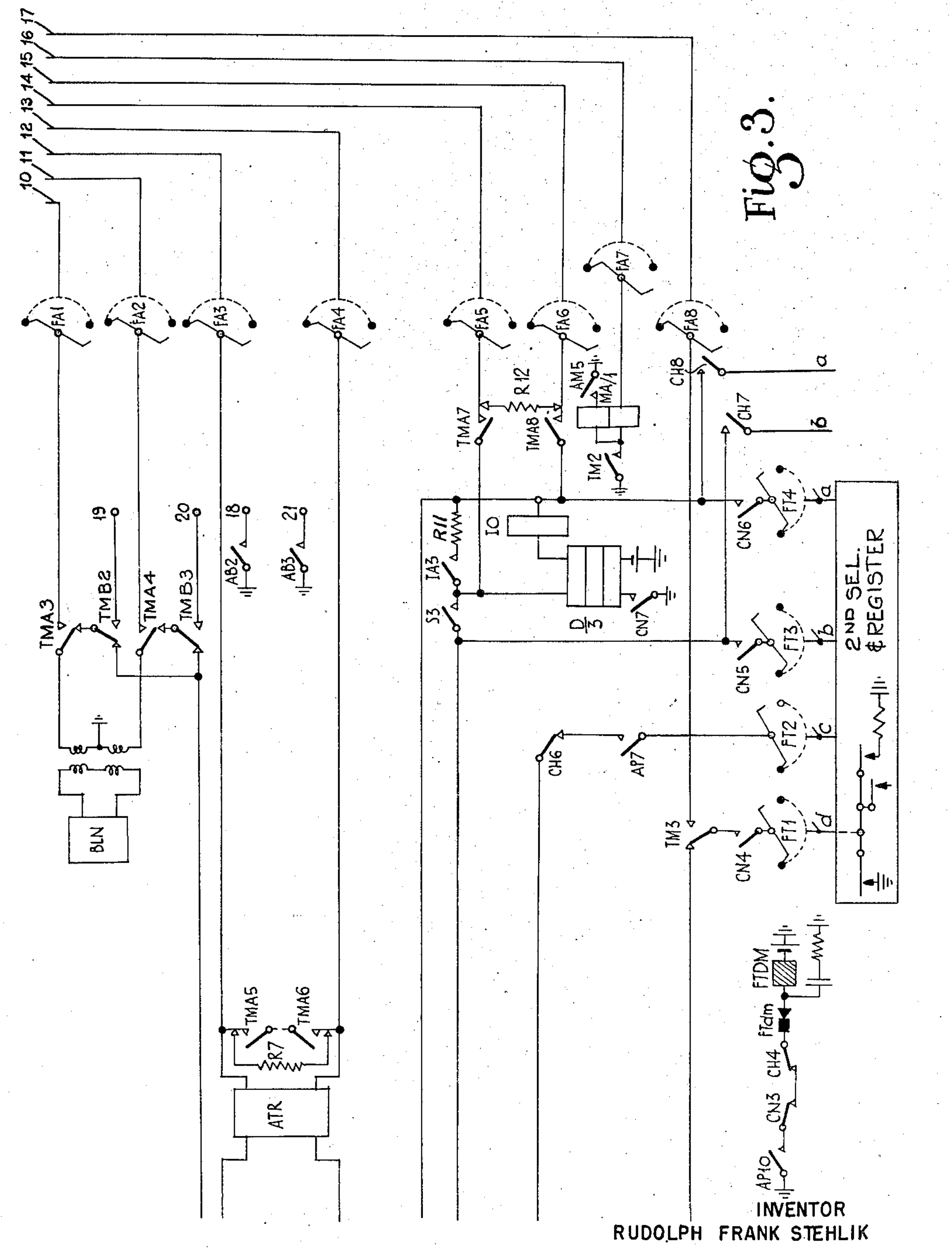

Referring now to the detailed circuits given in Figs. 2–5, it should be explained that the junction line relay set shown in Figs. 2 and 3 is arranged for inductive signalling over the junction line. A polarised relay P responds to the incoming signals while outgoing signals are transmitted by the operation of relays RS and PA.

On an incoming call over the junction line, relay P will operate in response to the seizing pulse and at contact P1 closes a circuit for relay S. Relay S at S1 closes a circuit over HA4 and AP2 for the left-hand winding of the two-step relay AP. Relay AP operates to close its "X" contacts AP1 and AP2 whereupon it operates fully and at contacts AP6 guards the junction relay set; at contacts AP9 it closes a circuit for relay IA which operates while at contacts AP10 relay AP closes a self-interrupting circuit for magnet FTDM of the hunting switch FT. This switch now operates to find an idle 2nd selector whereupon relay CN is operated from earth at AP5, lower winding of the relay, contacts CN2, CH6, AP7, wiper FT2 to battery in the 2nd selector. In the meantime relay AR operates over AP3 and at contacts AR3 and AR4 completes points in the speaking path between the junction line and the 2nd selector.

Relay CN is a two-step relay and when energised in the above circuit closes its "X" contacts CN1 whereupon the relay operates fully over its upper winding and at CN2 opens the original circuit. At contacts CN3, the circuit of the magnet FTDM is opened and at contacts CN4, CN5 and CN6 the junction relay set is extended to the 2nd selector, the *a* and *b* leads being looped over S3, windings of relay D and the impedance I0 in parallel with IA3 and R11. Further the polarising winding of relay D is completed at SN7 while at CN8 earth from AR2 is extended over HA3, RS3, CN8, M3 to battery through the right-hand winding of relay M. Relay M operates and closes its "X" contacts M1 to prepare a locking over both windings in series. Relay M also closes its "X" contact M2 thereby extending earth from AP4 over M2 and M5 to battery over the lower winding of relay PA. Relay PA operates and at PA1 short circuits its upper winding to increase its low-release time; at PA2 closes a circuit for the right-hand winding of relay RS which operates and at RS1 closes an alternative circuit for itself. Relay PA in operating also connects the secondary winding of transformer TR1 to the junction line at contacts PA6 and PA7 while relay RS at contacts RS4 energises the primary winding of the transformer TR1 whereby an inductive impulse is transmitted over the junction line to indicate to the distant exchange that impulse transmission may commence. Relay RS at RS3 opens a short circuit around the left-hand winding of relay M to permit relay M to operate in its second step. This impulse is terminated by the full operation of relay M whereupon the circuits of relays PA and RS are opened at M5 and these relays release.

Relay P responds to the impulses incoming over the junction line and the impulses are repeated by contact S3 to the 2nd selector and thence to a register which is taken into use immediately on the seizure of the 2nd selector. The subsequent operation of the junction relay set is dependent on the final destination of the connection as determined by the register. There are three possibilities, first that the connection is for a local subscriber; second that the connection is for a subscriber at another exchange not requiring the insertion of a repeater and third that the connection is for a subscriber at another exchange requiring the insertion of a repeater. In the first case direct earth is momentarily connected to the *d* lead from the register; in the second case no connection is made to the *d* lead while in the third case resistance earth is momentarily connected to the *d* lead. These three cases will now be considered in detail.

The connection of direct earth to the *d* lead causes relay CH to operate over its upper winding and relay AM to operate over its upper winding. Relay AM is a two-step relay and operates its "X" contact AM1 only. Before relay AM is able to operate fully after the disconnection of direct earth from the *d* lead, relay CH will have operated, locked over CH1 and at CH3 opened the circuit over the lower winding of relay AM. Relay AM thus releases when earth is removed from the *d* lead.

Relay CH in operating at CH5 opens the circuit of relay CN and at CH6 prevents its reoperation. Relay CN releases while relay CH at CH4 prevents further operation of the magnet FTDM which would have taken place on the release of relay CN. Further relay CN at CN4, CN5 and CN6 disconnects the relay set from the 2nd selector and register which thereupon release. Finally relay CH in operating at CH7 and CH8 extends the loop to the local switch train to enable the connection to be completed. Relay D operates on the reply of the called subscriber followed by relay DA which at DA3 and DA4 short-circuits the condensers C6 and C8 in the speaking connection.

On the release of the connection a release pulse will be transmitted over the junction and relay P releases followed by relay S. When the called subscriber restores, relay D releases followed by relay DA and the circuit of relay AP is opened during the release time of DA. Relay AP thus releases followed by relays AR and CH. The release of relay AR also releases relay M and the relay set is completely restored for further use.

If the connection is to be extended over an outgoing junction line to a distant exchange, the register will take into use an idle junction line leading to the required exchange. Such a junction line will have an associated junction relay set as shown in Figs. 2 and 3. Assuming the relay set shown in these figures is seized, relay A will be operated by earth applied to the *b* lead. Relay A at A1 operates relay RS which at RS1 extends earth from A1 over HA1 to the lower winding of relay PA which operates and at RS4 energises the primary winding of transformer TR1. Relay PA in operating at PA6 and PA7 connects the secondary winding of the transformer to the junction line to cause the transmission of an inductive seizing signal consisting of a positive pulse followed by a negative pulse. In addition relay PA at PA1 closes a short-circuit around its upper winding to increase its release time; locks over PA2 independent of RS1 and at PA4 closes a circuit for relay H which operates followed by relay HA. Relay H in operating also causes guarding earth over the low-resistance relay MS to be connected to the private conductor. Relay MS only operates when the outgoing relay set is taken into use by the local switch train and at MS1 and MS2 prevents any operation of relay AB. The operation of relay HA terminates the seizing pulse by opening at the break springs of HA1 the circuit of relays RS and PA which release, relay H being now held over the make springs of HA1. In addition relay HA at HA5 and HA6 completes the connection to the outgoing junction line.

The circuit remains in this condition until a reply pulse is received from the distant exchange. This causes the operation of relay P followed by relay S which at S1 closes a circuit for the right-hand winding of relay M. Relay M closes its "X" contact M1 and operates fully over both windings in series at the end of the pulse at the same time opening its original circuit at M4. In addition relay M at M6 completes a circuit from the register for the upper windings of relays A and AB and at M7 introduces the lower winding of relay AB in series with the lower winding of relay A. Relay A is now held by battery and earth on the *a* and *b* leads respectively but relay AB does not operate since its windings are differentially wound. The completion of the circuit over the *a* lead acts as a signal to the register that impulse transmission may begin. These impulses are received in the relay set as loop impulses by relay A and are converted into inductive impulses for transmission over the junction line by relays RS and PA, relay PA remaining operated between impulses.

In addition to causing the transmission of routing digits, the register also signals the relay set of the incoming junction line whether or not a repeater is to be connected up. In the second case mentioned above, when no repeater is to be connected up, the *d* lead accessible over FT1 remains disconnected so that neither relays CH or AM are operated. The connection from the incoming junction line to the outgoing junction line is thus completed directly over the 2nd selector and subsequent selecting stages if necessary, the register having released at the end of impulse transmission.

Figure 4:
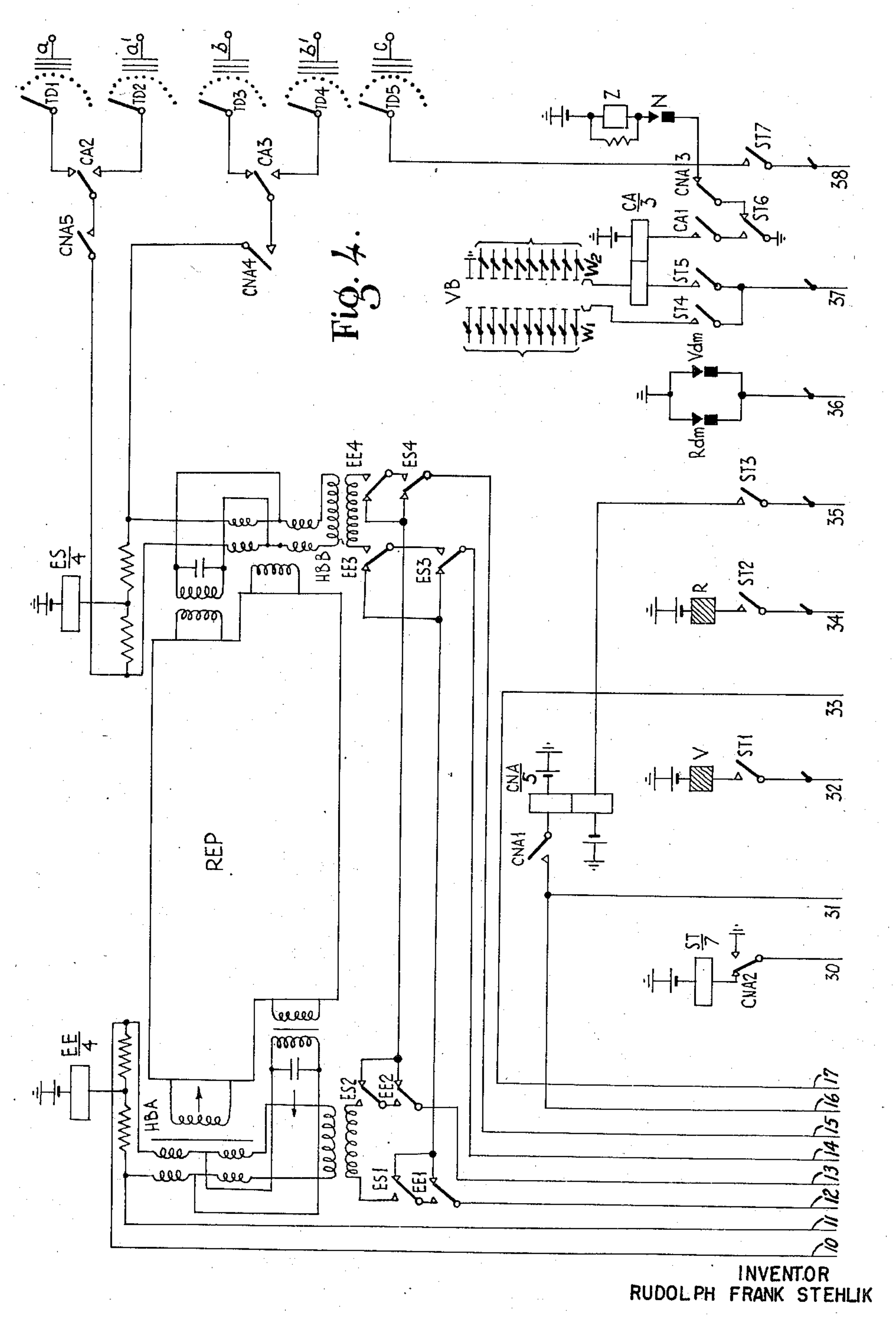
Fig. 4 shows a repeater circuit and the associated switching device.
Figure 5:
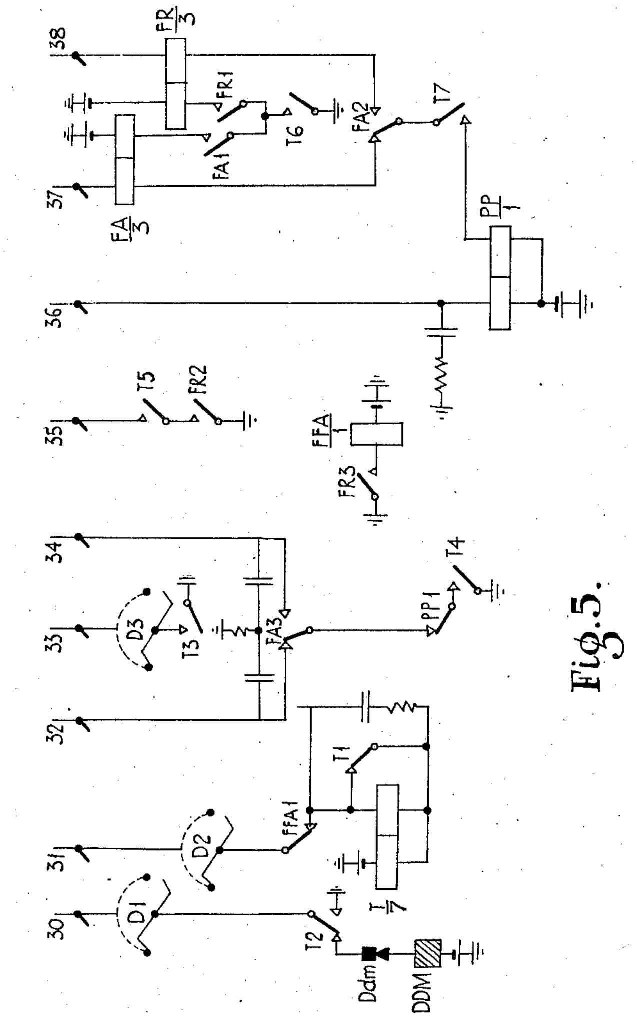
Fig. 5 shows the repeater distributor.

In the third case mentioned above relay CH in the incoming repeater does not operate when resistance earth is applied to the *d* lead so that AM is able to operate. Relay AM in operating at AM6 completes a circuit for magnet FADM of the finder switch FA which operates to find the next idle repeater which has been preselected by the distributor (Fig. 5). When the preselected repeater has been found, the following circuit is completed: earth, upper and lower windings of relay MA (Fig. 3), wipers FA7 and bank contact, lead 16 (Figs. 3 and 4), lead 31 (Figs. 4 and 5), bank contact and wiper D2, contacts FFA1, T1, left-hand winding of relay T to battery. Relay MA only operates in this circuit and at contacts MA1 opens the circuit of the magnet FADM at its break springs and at its make springs operates relay TM. Relay TM in operating at TM1 closes a circuit for relay TMA and at TM2 short-circuits the upper winding of relay MA whereupon relay T (Fig. 5) operates. Finally relay TM at the break springs of TM3 opens a further point in the circuit for relay AM and at the make springs extends earth on the operation of relay T in the distributor over lead 33 to lead 17 (Figs. 3 and 4), wiper FA8, contacts TM3 and CN4, wiper FT1 and thence to the register to indicate that a repeater has been taken into use. Relay TMA in operating at TMA1 and TMA2 opens the direct connection between the junction line and the wipers of the switch FT and extends it to the attenuator ATR and thence over wipers FA3 and FA4, contacts TMA5 and TMA6 being operated, to leads 12 and 13 (Figs. 3 and 4). The operation of relay TMA also at contacts TMA3 and TMA4 connects the balancing network BLN via wipers FA1 and FA2 to leads 10 and 11 (Figs. 3 and 4). The balancing network associated with the incoming line is thus connected to the selected repeater. Relay EE now operates over the simplex circuit including leads 10 and 11.

At the outgoing repeater when impulse transmission from the register has been completed earth is connected to the *b* lead in the register to cause the operation of relay AB, relay A remaining held over its upper winding. The operation of relay AB serves to identify the outgoing junction line in the vertical bank VB and test bank TD5 of the two-directional switch TD (Fig. 4) so that the appropriate outgoing balancing network may be connected to the repeater. Relay AB effects the necessary markings at AB2 and AB3 while at AB1 it closes a circuit for relay TMB which operates and locks over TMB1 and M8. Further relay TMB at TMB2 and TMB3 connects up the associated balancing network to the approriate contacts in banks TD1 and TD3 or TD2 and TD4 of the two directional switch TD.

Returning now to the operation of the distributor, when relay T operates fully on a short-circuit of the high-resistance winding of relay MA, at contact T1 it inserts its high-resistance right-hand winding into the series circuit to reduce the current drain; at T2 extends earth over D1 to operate relay ST and at contact T3 it earths lead 33 as previously mentioned. Relay ST in operating at ST1, ST2, ST3, ST4, ST5, ST6 and ST7 completes control circuits from the distributor to the two directional switch TD. Thus on the closing of contact ST1 the following circuit is completed for the vertical magnet V of the switch: earth, contacts T4, FA3, lead 32, contact ST1, winding of magnet V to battery. The magnet V operates and closes its interrupter springs V*dm* whereupon earth is fed over lead 36 to the left-hand winding of relay PP. Relay PP at PP1 opens the energising circuit of the vertical magnet which releases, opens its interrupter springs and the circuit for relay PP which releases and again closes the circuit of the vertical magnet. This interaction continues until either of the vertical wipers W1 and W2 reaches a contact marked by contact AB2 (Fig. 3) over terminal 18. Assume that W1 reaches the marked contact the earth will be extended from contact AB2, terminal 18, vertical bank contact and wiper W1, contact ST4, lead 37, left-hand winding of relay FA, contacts FA2 and T7, right-hand winding of relay PP to battery. Relay PP operates to prevent further stepping of the vertical magnet. Relay FA locks over its right-hand winding, contacts FA1 and T6 and at contact FA3 connects up the circuit for the rotary magnet while at contacts FA2 a test circuit is completed to wiper TD5.

Relay PP releases when relay FA operates and the rotary magnet now interacts with relay PP to rotate the wipers over the contacts in the selected bank in search of the particular contact marked by contact AB3 over terminal 21. When this contact is found, relay FR operates over its right-hand winding in series with the right-hand winding of PP, relay FR locking over its left-hand winding. Relay PP prevents further operation of the rotary magnet while relay FR at FR2 extends earth over T5, lead 35, ST3, lower winding of relay CNA to battery. Relay CNA operates and locks over CNA1 in parallel with relay T and at CNA4 and CNA5 connects the balancing network of the outgoing junction line over contacts TMA3, TMA4, TMB2, TMB3, terminals 19, 20, wipers TD1 and TD3, contacts CA2, CA3, CNA4, CNA5, to the hybrid coil HBB of the repeater, relay ES operating over the simplex circuit. The operation of relay EE has been previously described and with relays EE and ES2 operated the speaking connection now extends from the incoming junction line over contacts TMA1, TMA2, attenuator ATR, wipers FA3, FA4, leads 12 and 13, contacts EE1, EE2, ES1 and ES2 to the input terminals of the hybrid coil HBA, through the repeater to the output terminals of the hybrid coil HBB, contacts EE3, EE4, ES3, ES4, leads 14, 15, wipers FA5, FA6, contacts TMA7, TMA8, CN5, CN6, wipers FT3 and FT4 via the 2nd selector to the outgoing junction line.

Relay FR in operating at contacts FR3 closes a circuit for the slow-to-operate relay FFA while at contacts FFA1 opens the circuit for relay T which releases and at T2 closes the following circuit for the distributor magnet DDM: earth, CNA2 (Fig. 4), lead 30, bank contact and wiper D1, contact T2, interrupter springs D*dm*, magnet DDM, battery. The distributor now hunts for the next idle repeater which will be marked by absence of earth on the lead corresponding to lead 30. Further operation of the distributor is then stopped.

The register is timed to release after the operation of relay AB, the time interval being sufficient to ensure the operation of the switch TD. When the register releases, relay AB releases but relay A is held from the loop at the incoming relay set.

On the reply of the called party, a reply pulse will be transmitted back over the outgoing junction to operate relay P followed by relay S. Earth is now extended over S1, HA4, M4, RE2 to battery through the upper winding of relay RE. Relay RE operates its "X" contacts RE1 and at the end of the pulse operates fully over both windings in series and at RE2 opens the original circuit. At RE3 and RE4 condensers C5 and C4 in the speaking leads are short-circuited while at RE5 and RE6, the battery connections to the incoming junction relay set are reversed to cause the operation of relay D followed by DA. The operation of these relays is without effect at this time.

At the end of conversation a release pulse will be transmitted to the incoming junction relay set from the originating exchange and relay P will release followed by relay S. Relay S at contacts S3 opens the loop across the *a* and *b* leads so that relay A in the outgoing relay set releases while relay D in the incoming relay set releases followed by relay DA, which is slow-to-release. Relay AP thus releases during the release time of relay DA and at AP3 opens the circuit of relay AR. With relays AP and AR released, the holding circuits of the operated relays in the relay set are opened and the relays release. The release of relay TM at contacts TM2 opens the locking circuit of relay CNA in the repeater circuit which releases and at CNA3 closes the circuit of the release magnet Z of the switch TD. Also the release of relay TMA in the junction set causes the release of relay EE in the repeater circuit.

In the outgoing relay set, relay A in releasing opens the circuit of relay H which is slow-to-release so that during the release period a circuit is completed over A1 and H2 for relay PA which operates and closes a circuit for relay RS to transmit a short release pulse to the distant exchange, the pulse being terminated by the release of relay H. Relay H in releasing opens the circuit of relay HA which in releasing opens the holding circuits of the operated relays of the relay set.

I claim:

1. A telephone system comprising at least one exchange adapted to set up long distance connections automatically, junction lines in said exchange, means for switching calls through said junction lines, voice amplifying repeaters in said exchange, a balancing network associated with each junction line, means for connecting each of said networks with its associated junction line, a distributor in said exchange to connect an incoming junction line with an idle repeater, a marginal relay and second relay connected in parallel to control the operation of said distributor, means for placing a resistance in the operating circuit of said relays whereby only said second relay is energized, circuits connecting the contacts of said marginal relay and said second relay to said distributor whereby said distributor is operated to place a repeater in a circuit when only said second relay is energized, switching means connected to the outgoing end of said repeaters, and a balancing network for the outgoing connection of said repeaters.

2. A telephone system comprising at least one exchange adapted to set up long distance connections automatically, voice amplifying repeaters in said exchange, a plurality of junction lines in said exchange, a distributor to connect an incoming junction line with an idle repeater, a marginal relay and second relay with contacts which actuate said distributor to cut in an idle repeater when said second relay only is energized, means for energizing said one relay when a long distance call is passing through said exchange, switching means connected to the outgoing end of the repeater selected by said distributor, a balancing network for the outgoing connection of said repeater, and a circuit connecting said balancing network to said outgoing connection.

3. A telephone system comprising at least one exchange adapted to set up long distance connections automatically, a plurality of voice amplifying repeaters in said exchange, a plurality of incoming junction lines in said exchange, a balancing network for each incoming junction line, a distributor in said exchange for connecting an incoming junction line with an idle repeater, a marginal relay and a second relay with contacts which complete a circuit for the operation of said distributor when said second relay only is energized whereby said distributor connects an incoming junction line with a repeater, a plurality of balancing networks for said repeater, a wiper switch connected to the outgoing end of said repeater and said balancing networks, and means for operating said wiper switch to choose an appropriate balancing network for said repeater.

4. A telephone system comprising at least one exchange adapted to set up long distance connections automatically, a plurality of voice amplifying repeaters in said exchange, a plurality of incoming junction lines in said exchange, a balancing network connected to each junction line, a distributor in said exchange, a circuit connecting said junction lines to said repeaters through said distributor whereby said distributor may be operated to connect one of said incoming junction lines with an idle repeater, a control circuit for said distributor, a marginal relay and a second relay with contacts in said control circuit which operate said distributor when said second relay is energized, means responsive to a called number for energizing said relays, a plurality of balancing networks, and a two-directional switch in the circuit of each of said repeaters, a junction relay set, means for operating said switch to hunt for markings extended thereto from an outgoing junction relay set and to connect one of said balancing networks appropriate to the junction line with the repeater.

5. A telephone system comprising at least one exchange adapted to set up long distance connections automatically, a plurality of voice amplifying repeaters and junction lines in said exchange, a register to determine which calls require a repeater, a pair of relays responsive to said register, one of said relays being marginal, said register furnishing direct ground for the operation of both of said relays on local calls and ground through a resistance on toll calls requiring a repeater whereby said marginal relay is not energized, a distributor for connecting an incoming junction line to an idle repeater, an operating circuit for said distributor responsive to the energization of the one of said pair of relays which is not marginal, a wiper switch connected to the outgoing end of the repeater selected by said distributor, an outgoing junction relay set to extend markings to said wiper switch, and a balancing network appropriate to said junction line connected to said repeater by operation of said wiper switch.

6. In a telephone system comprising at least one exchange adapted to set up long distance connections automatically, a plurality of junction lines, a plurality of repeaters, a register which discriminates between calls requiring a repeater and calls which do not, said register furnishing ground through a resistance for calls requiring a repeater, a marginal relay and a second relay in the ground circuit from said register, said marginal relay remaining unoperated when said register furnishes ground through a resistance, and means responsive to the operation of said second relay and non-operation of said marginal relay for connecting a repeater to a junction line being used for a call.

RUDOLPH FRANK STEHLIK.

REFERENCES CITED

The following references are of record in the file of this patent:

UNITED STATES PATENTS

| Number | Name | Date |
|---|---|---|
| 1,647,286 | Fisher | Nov. 1, 1927 |
| 1,647,796 | Glezen | Nov. 1, 1927 |
| 1,708,983 | Vroom | Apr. 16, 1929 |
| 1,763,013 | Skillman | June 10, 1930 |
| 1,763,893 | Krecek | June 17, 1930 |
| 1,793,295 | Dahms | Mar. 10, 1931 |
| 1,829,803 | Korn | Nov. 3, 1931 |
| 2,025,145 | Bascom | Dec. 24, 1935 |
| 2,311,774 | Peterson | Feb. 23, 1943 |
| 2,398,854 | Ray | Apr. 23, 1946 |
| 2,421,034 | McKim | May 27, 1947 |